(12) United States Patent
Nagata et al.

(10) Patent No.: US 6,862,084 B2
(45) Date of Patent: Mar. 1, 2005

(54) LASER RANGE FINDER

(75) Inventors: Koichi Nagata, Saitama (JP); Toshihisa Ishijima, Saitama (JP); Mokuyoo Nakano, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 10/656,285

(22) Filed: Sep. 8, 2003

(65) Prior Publication Data

US 2004/0046953 A1 Mar. 11, 2004

(30) Foreign Application Priority Data

Sep. 9, 2002 (JP) ........................................ 2002-262794

(51) Int. Cl.[7] .......................... G01C 3/08; G02B 23/00
(52) U.S. Cl. ..................................... 356/5.01; 359/407
(58) Field of Search ............................. 356/4.01–5.15; 359/402–418

(56) References Cited

U.S. PATENT DOCUMENTS

| | | | | |
|---|---|---|---|---|
| 5,581,399 A | * | 12/1996 | Abe ........................... | 359/410 |
| 6,226,123 B1 | * | 5/2001 | Kanai et al. ................. | 359/557 |
| 6,330,056 B1 | * | 12/2001 | Zadravec ..................... | 356/4.01 |
| 6,369,941 B2 | * | 4/2002 | Zadravec ..................... | 359/419 |
| 6,515,799 B2 | * | 2/2003 | Ishijima et al. ............. | 359/557 |
| 6,704,502 B2 | * | 3/2004 | Morofuji ..................... | 396/55 |

FOREIGN PATENT DOCUMENTS

| | | |
|---|---|---|
| DE | 37 04 848 C2 | 3/1988 |
| JP | 6-250100 | 9/1994 |
| JP | 8-262330 | 10/1996 |
| JP | 2000-66113 | 3/2000 |
| JP | 2001-50742 | 2/2001 |
| JP | 2001-124856 | 5/2001 |

\* cited by examiner

*Primary Examiner*—Bernarr E. Gregory
*Assistant Examiner*—Brian Andrea
(74) *Attorney, Agent, or Firm*—Birch, Stewart, Kolasch & Birch, LLP

(57) ABSTRACT

In the laser range finder, a sending portion that emits laser light to a target and a receiving portion that receives the laser light reflected by the target are supported on a gimbals together with erecting prisms of a binocular optical system, and their attitudes are controlled so as to be secured to an inertial system. This eliminates influence of a shake, and allows accurate aiming at a faraway target and measurement of a distance thereto with high accuracy.

6 Claims, 13 Drawing Sheets

LASER RANGE FINDER

BACKGROUND OF THE INVENTION

1. Field of the Invention

The present invention relates to a laser range finder, and more particularly to a laser range finder having a vibration isolation function.

2. Description of the Related Art

A laser range finder is one of devices that measure a distance to a target by a light flux having a predetermined wavelength.

The laser range finder includes a sending portion that emits laser light to the target, a receiving portion that receives the laser light reflected by the target, a telescope used for confirming the target by an observer, or the like, wherein the telescope is aimed at the target to emit the laser light, and a time between when the laser light is emitted and when the laser light is reflected and returned is measured to calculate a distance to the target (for example, see Japanese Patent Application Publication Nos. 8-262330, 2001-50742 and 2001-124856).

However, if the conventional laser range finder is held by hand and operated, vibration of the hand is transmitted to the device to cause displacement of a measurement point and prevent accurate measurement. In particular, when a faraway target is measured, a slight shake causes significant displacement of a measurement point, thus preventing measurement with high accuracy.

Such a problem also occurs when the laser range finder is used in a ship or a vehicle, besides when it is held by hand and operated.

SUMMARY OF THE INVENTION

The present invention is achieved in view of the above, and has an object to provide a laser range finder that can observe a faraway target and measure a distance with high accuracy.

In order to attain the above described object, the present invention is directed to a laser range finder, comprising: an optical system which is one of monocular and binocular and has an erecting prism between an objective lens and an eyepiece; a vibration isolation device which controls an attitude of an optical element constituting the optical system so as to be secured to an inertial system; a sending portion which is provided on the vibration isolation device and emits laser light; a receiving portion which is provided on the vibration isolation device and receives the laser light reflected by a target; a measurement device which measures a time between when the laser light is emitted from the sending portion and when the laser light is received by the receiving portion; and a calculation device which calculates a distance to the target based on the time measured by the measurement device.

According to the present invention, the sending portion that emits the laser light to the target and the receiving portion that receives the laser light reflected by the target are provided on the vibration isolation device, and their attitudes are controlled so as to be secured to the inertial system together with the optical element that constitutes the monocular optical system or the binocular optical system. This eliminates influence of a shake, and allows accurate aiming at a faraway target and measurement of a distance thereto with high accuracy.

In order to attain the above described object, the present invention is also directed to a laser range finder, comprising: a binocular optical system which has a pair of erecting prisms between a pair of objective lenses and a pair of eyepieces; a vibration isolation device which controls attitudes of a pair of optical elements constituting the binocular optical system so as to be secured to an inertial system; a sending portion which emits laser light through one optical element; a receiving portion which receives the laser light reflected by a target through the optical element; a measurement device which measures a time between when the laser light is emitted from the sending portion and when the laser light is received by the receiving portion; and a calculation device which calculates a distance to the target based on the time measured by the measurement device.

According to the present invention, the laser light is emitted from the sending portion and received by the receiving portion through the optical element whose attitude is controlled so as to be secured to the inertial system. This eliminates influence of a shake, and allows accurate aiming at a faraway target and measurement of a distance thereto with high accuracy.

In order to attain the above described object, the present invention is also directed to a laser range finder, comprising: an optical system which is one of monocular and binocular and has an erecting prism between an objective lens and an eyepiece; a body frame to which the objective lens and the eyepiece are secured; a vibration isolation device which rotatably supports the erecting prism on the body frame via a gimbals and controls an attitude of the erecting prism so as to secure the erecting prism to an inertial system; a sending portion which is supported on the gimbals together with the erecting prism and emits laser light; a receiving portion which is supported on the gimbals together with the erecting prism and receives the laser light reflected by a target; a measurement device which measures a time between when the laser light is emitted from the sending portion and when the laser light is received by the receiving portion; and a calculation device which calculates a distance to the target based on the time measured by the measurement device.

According to the present invention, the sending portion that emits the laser light to the target and the receiving portion that receives the laser light reflected by the target are supported on the gimbals together with the erecting prism, and their attitudes are controlled so as to be secured to the inertial system together with the erecting prism by the vibration isolation device. This eliminates influence of a shake, and allows accurate aiming at a faraway target and measurement of a distance thereto with high accuracy.

In order to attain the above described object, the present invention is also directed to a laser range finder, comprising: a binocular optical system having a pair of erecting prisms between a pair of objective lenses and a pair of eyepieces; a body frame to which the pair of objective lenses and the pair of eyepieces are secured; a vibration isolation device which supports the pair of erecting prisms on the body frame via a gimbals and controls attitudes of the pair of erecting prisms so as to secure the pair of erecting prisms to an inertial system; a sending portion which is provided on the body frame and emits laser light; a first optical path dividing device which is provided on the body frame and between one erecting prism and one eyepiece, transmits visible light, and reflects the laser light emitted from the sending portion to guide the laser light to the one erecting prism; a second optical path dividing device which is provided on the body frame and between the other erecting prism and the other eyepiece, and separates the laser light reflected by a target from the visible light; a receiving portion which is provided on the body frame and receives the laser light separated by the second optical path dividing device; a measurement device which measures a time between when the laser light is emitted from the sending portion and when the laser light is received by the receiving portion; and a calculation device which calculates a distance to the target based on the time measured by the measurement device.

According to the present invention, the laser light is emitted from the sending portion and received by the receiving portion via the erecting prism whose attitude is controlled so as to be secured to the inertial system. This eliminates influence of a shake, and allows accurate aiming at a faraway target and measurement of a distance thereto with high accuracy.

In order to attain the above described object, the present invention is also directed to a laser range finder, comprising: an optical system which is one of monocular and binocular and has an erecting prism between an objective lens and an eyepiece; a body frame to which the objective lens and the eyepiece are secured; a vibration isolation device which rotatably supports the erecting prism on the body frame via a gimbals and controls an attitude of the erecting prism so as to secure the erecting prism to an inertial system; a sending portion which is supported on the gimbals together with the erecting prism and emits laser light; an optical path dividing device which is provided on the body frame and between the erecting prism and the eyepiece, and separates the laser light reflected by a target from visible light; a receiving portion which is provided on the body frame and receives the laser light separated by the optical path dividing device; a measurement device which measures a time between when the laser light is emitted from the sending portion and when the laser light is received by the receiving portion; and a calculation device which calculates a distance to the target based on the time measured by the measurement device.

According to the present invention, the laser light is emitted to the target from the sending portion whose attitude is controlled so as to be secured to the inertial system together with the erecting prism. Then, the laser light reflected by the target is received by the receiving portion via the erecting prism whose attitude is controlled so as to be secured to the inertial system. This eliminates influence of a shake, and allows accurate aiming at a faraway target and measurement of a distance thereto with high accuracy.

In order to attain the above described object, the present invention is also directed to a laser range finder, comprising: an optical system which is one of monocular and binocular and has an erecting prism between an objective lens and an eyepiece; a body frame to which the objective lens and the eyepiece are secured; a vibration isolation device which supports the erecting prism on the body frame via a gimbals and controls an attitude of the erecting prism so as to secure the erecting prism to an inertial system; a sending portion which is provided on the body frame and emits laser light; an optical path dividing device which is provided between the erecting prism and the eyepiece, transmits visible light, and reflects the laser light emitted from the sending portion to guide the laser light to the erecting prism; a receiving portion which is supported on the gimbals together with the erecting prism and receives the laser light reflected by the target; a measurement device which measures a time between when the laser light is emitted from the sending portion and when the laser light is received by the receiving portion; and a calculation device which calculates a distance to the target based on the time measured by the measurement device.

According to the present invention, the laser light emitted from the sending portion is emitted to the target via the erecting prism whose attitude is controlled so as to be secured to the inertial system. Then, the laser light reflected by the target is received by the receiving portion whose attitude is controlled so as to be secured to the inertial system together with the erecting prism. This eliminates influence of a shake, and allows accurate aiming at a faraway target and measurement of a distance thereto with high accuracy.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Preferred embodiments of a laser range finder according to the present invention will be described with reference to the accompanying drawings.

Figure 1:
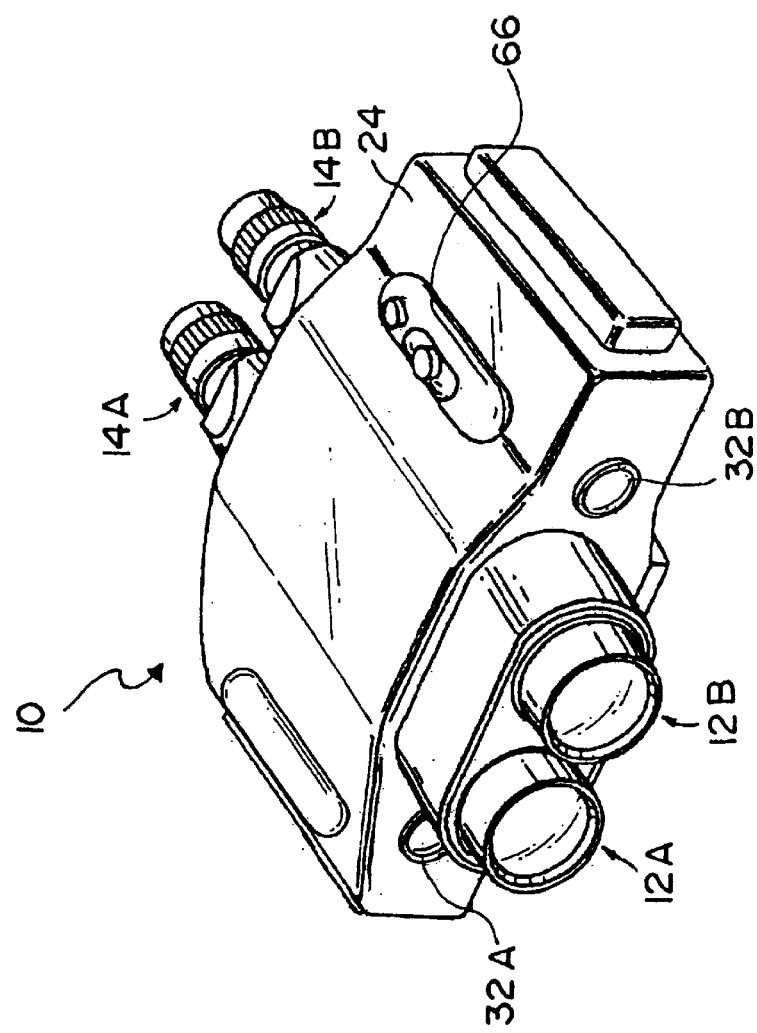
FIG. 1 is a perspective view of an appearance of a laser range finder according to a first embodiment of the present invention.
Figure 2:
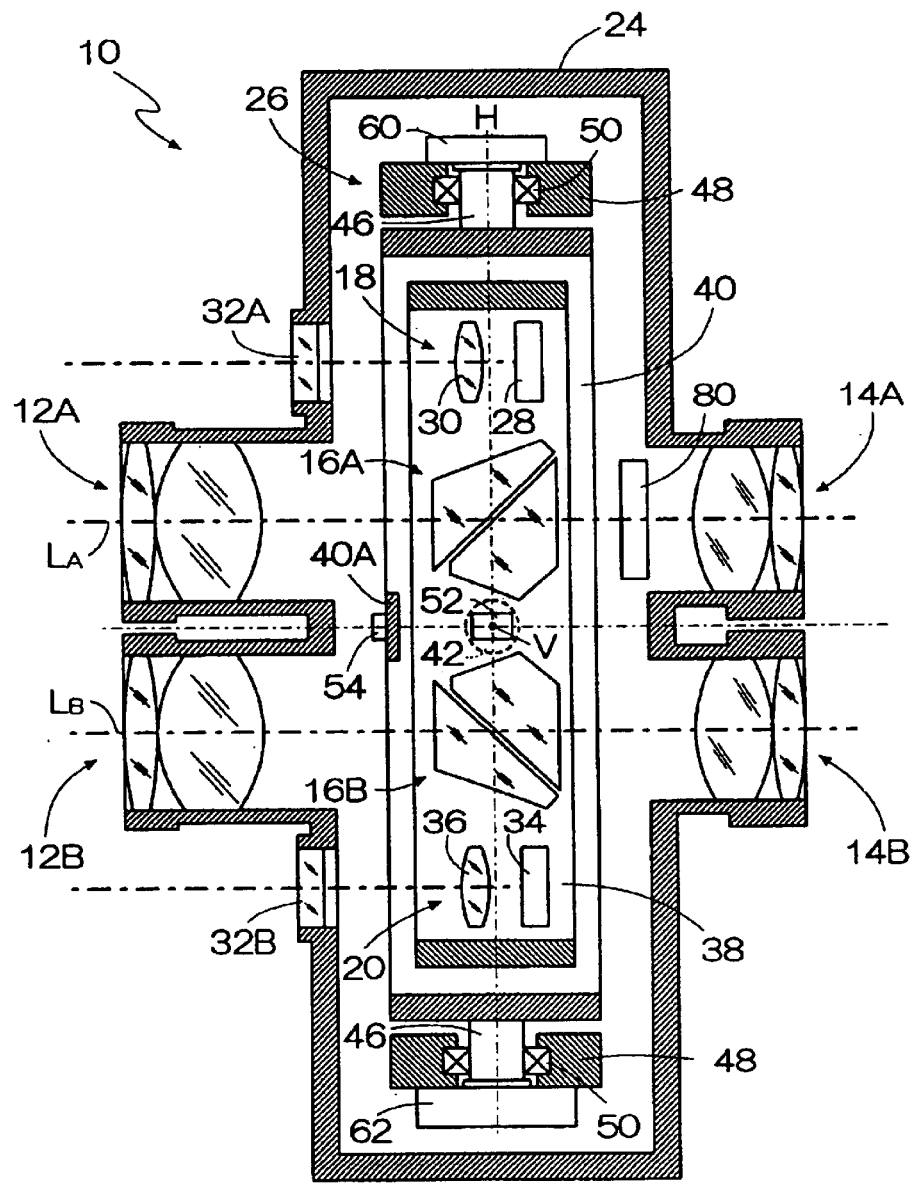
FIG. 2 is a plan sectional view of the laser range finder according to the first embodiment of the present invention.
Figure 3:
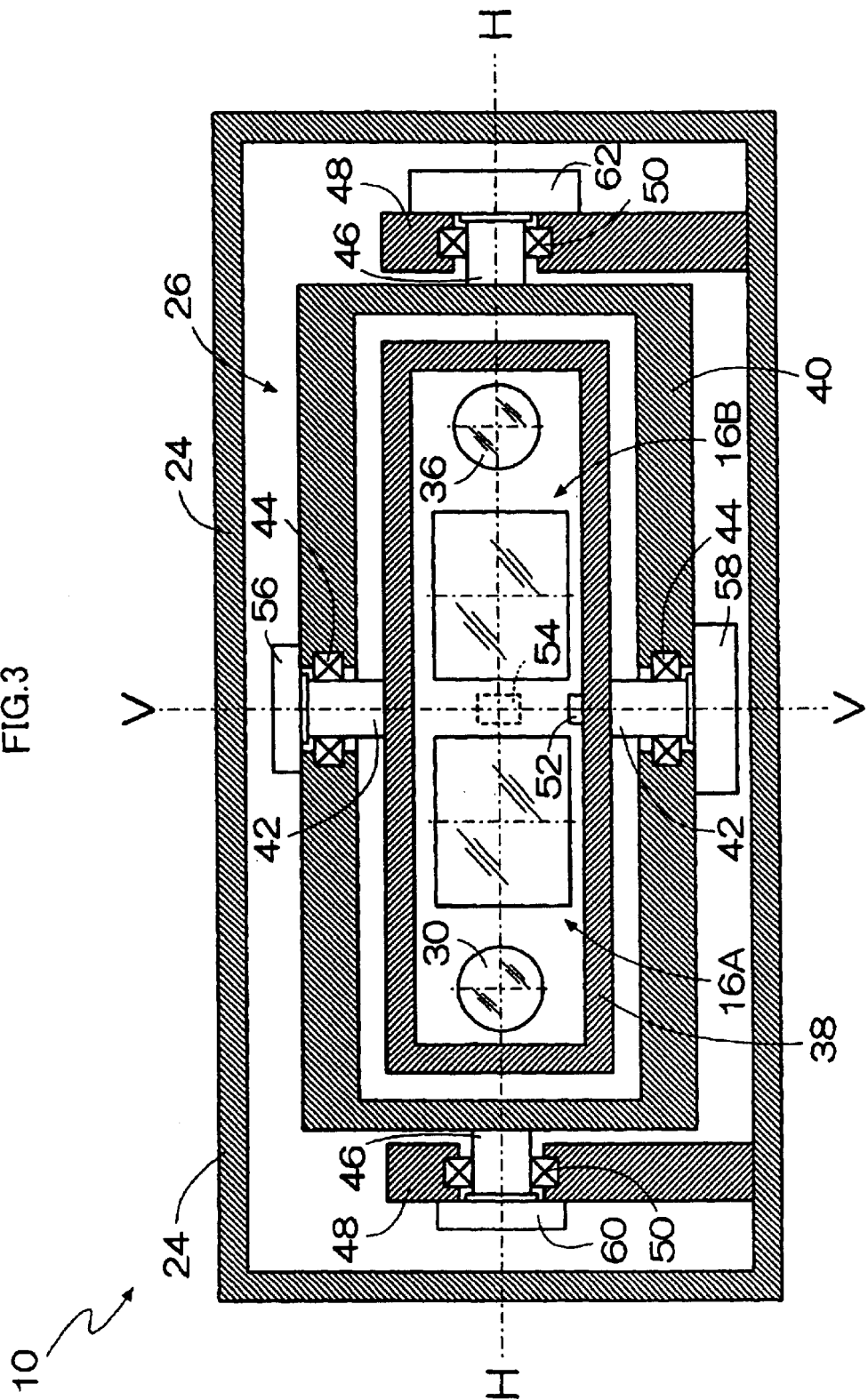
FIG. 3 is a front sectional view of the laser range finder according to the first embodiment of the present invention.

FIGS. 1, 2 and 3 are a perspective view of an appearance, a plan sectional view, and a front sectional view of a laser range finder according to a first embodiment of the present invention.

As shown in the drawings, a laser range finder 10 according to the first embodiment includes a binocular system having a pair of erecting prisms 16A, 16B between a pair of objective lens systems 12A, 12B and a pair of eyepiece systems 14A, 14B, a sending portion (light emitting optical system) 18 that emits laser light to a target, and a receiving portion (light receiving optical system) 20 that receives the laser light reflected by the target.

The pair of objective lens systems 12A, 12B and the pair of eyepiece systems 14A, 14B that constitute the binocular system are secured to a body frame 24, and the erecting prisms 16A, 16B are supported on a gimbals 26 provided in the body frame 24. The sending portion 18 and the receiving portion 20 are supported on the gimbals 26 together with the erecting prisms 16A, 16B.

The sending portion 18 is constituted by a laser light emitting element 28, which emits laser light having a wavelength of about 850 to 950 nm, and a sending lens 30, and the laser light emitted from the laser light emitting element 28 is emitted from a laser light emitting window 32A to the target via the sending lens 30.

On the other hand, the receiving portion 20 is constituted by a light receiving element 34 and a receiving lens 36, and the laser light that is reflected by the target and enters from a laser light receiving window 32B is received by the light receiving element 34 via the receiving lens 36.

The gimbals 26 is a mechanism that supports the erecting prisms 16A, 16B, the sending portion 18, and the receiving portion 20 rotatably around a horizontal axis and a vertical axis. In a state where the gimbals 26 is secured, that is, where the erecting prisms 16A, 16B are secured to the body frame 24, the binocular system of the laser range finder 10 has the same structure as a general binocular system.

The gimbals 26 is constituted by an internal gimbal 38 and an external gimbal 40, and supports the erecting prisms 16A, 16B rotatably around the vertical axis (axis V in the drawing) and the horizontal axis (axis H in the drawing).

Vertical rotation axes 42, 42 extending vertically of the body frame 24 (in the direction of the axis V in the drawing) are attached to centers of top and bottom surfaces of the internal gimbal 38, and the vertical rotation axes 42, 42 are rotatably supported on an inside of the external gimbal 40 via bearings 44, 44 provided on centers of top and bottom surfaces of the external gimbal 40 (rotatably supported around the axis V in the drawing).

On the other hand, horizontal rotation axes 46, 46 extending horizontally of the body frame 24 (in the direction of the axis H in the drawing) are attached to centers of both side surfaces of the external gimbal 40, and the horizontal rotation axes 46, 46 are rotatably supported on a pair of brackets 48, 48 vertically standing on the body frame 24 via bearings 50, 50 (rotatably supported around the axis H in the drawing).

The erecting prisms 16A, 16B, the sending portion 18, and the receiving portion 20 are mounted to the internal gimbal 38, and rotate around the vertical axis by the internal gimbal 38 rotating around the vertical rotation axis 42 in the external gimbal 40. Then, the erecting prisms 16A, 16B, the sending portion 18, and the receiving portion 20 rotate around the horizontal axis by the external gimbal 40, which holds the internal gimbal 38, rotating around the horizontal rotation axis 46 between the pair of brackets 48, 48.

The internal gimbal 38 has an angular velocity sensor 52 at a center of a bottom surface of an inner peripheral portion of the internal gimbal 38, and the external gimbal 40 has an angular velocity sensor 54 at a center of a post 40A standing at a center of a front surface of the external gimbal 40. The angular velocity sensor 52 detects a rotation angular velocity $\omega_V$, when the internal gimbal 38 rotates around the vertical axis (laterally oscillates) with a lateral (horizontal) shake of the body frame 24. The angular velocity sensor 54 detects a rotation angular velocity $\omega_H$, when the external gimbal 40 rotates around the horizontal axis (vertically oscillates) with a longitudinal (vertical) shake of the body frame 24.

A position sensor 56, which detects a rotation angle $\theta_V$ of the vertical rotation axis 42 attached to the internal gimbal 38, is mounted to a top surface of an outer peripheral portion of the external gimbal 40 that supports the internal gimbal 38, and a rotation drive motor 58 that rotatably drives the vertical rotation axis 42 is mounted to a bottom surface of the outer peripheral portion.

A position sensor 60, which detects a rotation angle $\theta_H$ of the horizontal rotation axis 46 attached to the external gimbal 40, is mounted to one of the brackets 48 that support the external gimbal 40, and a rotation drive motor 62 that rotatably drives the horizontal rotation axis 46 is mounted to the other bracket 48.

The rotation drive motor 58 is driven and controlled, based on detected values of the angular velocity sensor 52 and the position sensor 56, so that the erecting prisms 16A, 16B, the sending portion 18, and the receiving portion 20 always return to their initial attitudes against the lateral (horizontal) shake of the body frame 24. The rotation drive motor 62 is driven and controlled, based on detected values of the angular velocity sensor 54 and the position sensor 60, so that the erecting prisms 16A, 16B, the sending portion 18, and the receiving portion 20 always return to their initial attitudes against the longitudinal (vertical) shake of the body frame 24.

Figure 4:
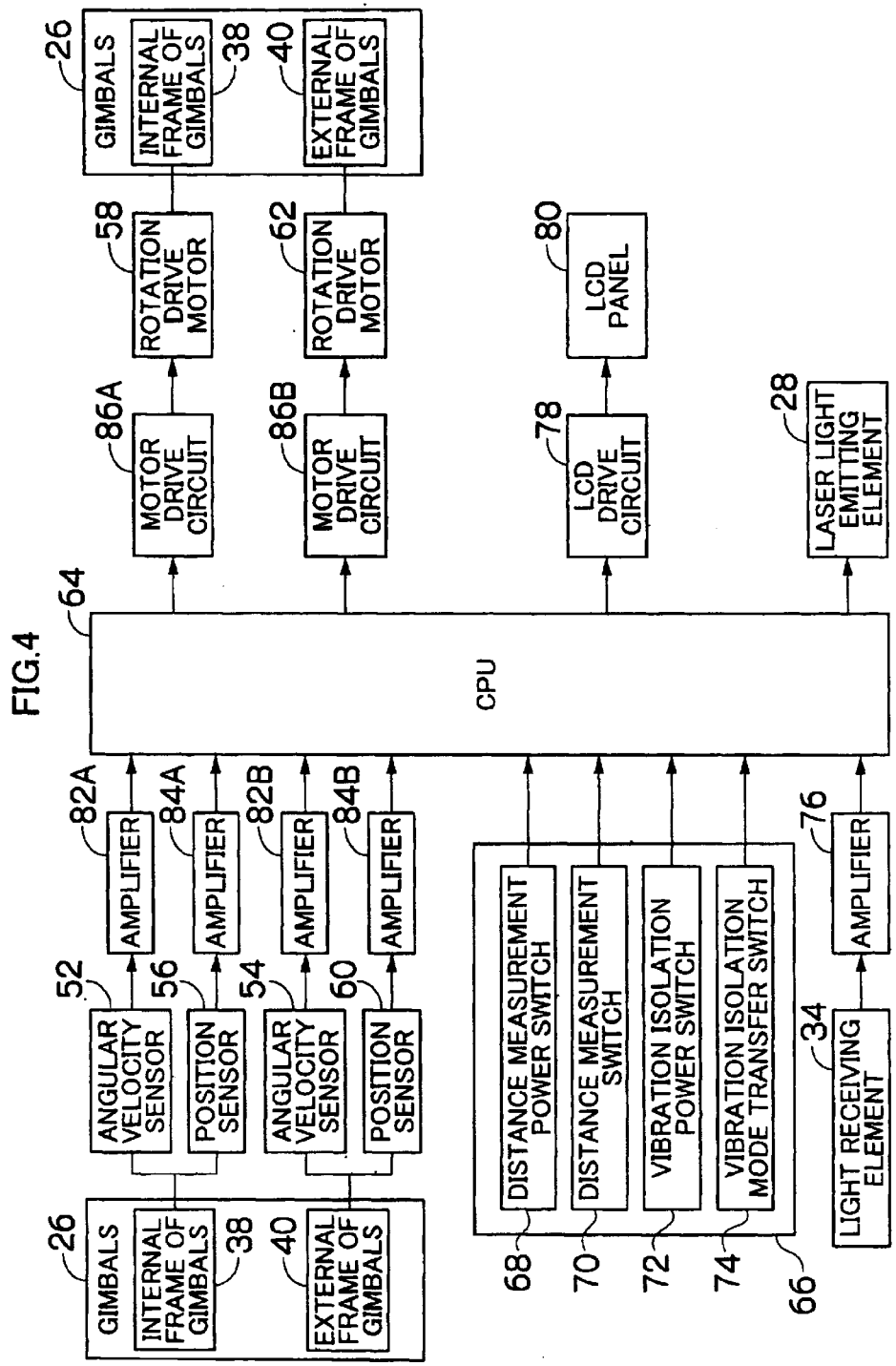
FIG. 4 is a block diagram of an internal structure of the laser range finder.

FIG. 4 is a block diagram of an internal structure of the laser range finder 10 according to the embodiment.

In FIG. 4, a central processing unit (CPU) 64 is a control unit that controls the laser range finder 10 in a centralized manner, and controls each circuit based on input signals from an operation unit 66.

The operation unit 66 includes a distance measurement power switch 68, a distance measurement switch 70, a vibration isolation power switch 72, a vibration isolation mode transfer switch 74, or the like, and these switches are provided on a surface of a casing. The distance measurement power switch 68 is a switch for turning on power of a distance measuring system, and the distance measurement switch 70 is pressed, in a state where the power of the distance measuring system is turned on, to measure a distance. The vibration isolation power switch 72 is a switch for turning on power of a vibration isolation system, and the vibration isolation mode transfer switch 74 is a switch for transferring modes (a vibration isolation mode and a panning mode) of the vibration isolation system.

When the distance measurement switch 70 is pressed in the state where the power of the distance measuring system is turned on, a distance measuring start signal is output from the distance measurement switch 70 to the CPU 64. When the distance measuring start signal is input to the CPU 64, the CPU 64 outputs a control signal for instructing to emit the laser light to the laser light emitting element 28 of the sending portion 18.

The laser light emitted from the laser light emitting element 28 is emitted from the laser light emitting window 32A to the target via the sending lens 30. Then, the laser light reflected by the target enters the light receiving element 34 from the laser light receiving window 32B via the receiving lens 36, and is photoelectrically converted in the light receiving element 34. A light receiving signal obtained by the photoelectric conversion in the light receiving element 34 is amplified by an amplifier 76 and then input to the CPU 64.

The CPU 64 measures a time between a moment when the laser light emitting element 28 emits the laser light (when the control signal for instructing to emit the laser light is output to the laser light emitting element 28) and a moment when the laser light is received by the light receiving element 34 (when the light receiving signal is input from the light receiving element 34 via the amplifier 76), and calculates a distance to the target from the measured time. Then, a control signal is output to an LCD drive circuit 78 based on a calculation result to display a distance measurement result on an LCD panel 80.

When the power of the distance measuring system is turned on, the CPU 64 outputs the control signal to the LCD drive circuit 78 to display an index that indicates a distance measuring point on a center of the LCD panel 80. An observer sets the target to be measured on the index.

On the other hand, when the power of the vibration isolation system is turned on, the vibration isolation system is activated. Specifically, detected signals of the angular velocity (angular velocity signals) output from the angular velocity sensors 52, 54 are input to the CPU 64 via amplifiers 82A, 82B, and detected signals of the angle (angle signals) output from the position sensors 56, 60 are input to the CPU 64 via the amplifiers 84A, 84B.

The CPU 64 calculates the amount of drive of the rotation drive motors 58, 62 such as to return the erecting prisms 16A, 16B, the sending portion 18, and the receiving portion 20 to their original attitudes, based on the angular velocity signals and the angle signals. Then, control signals based on calculation results are output to the motor drive circuits 86A, 86B, and the rotation drive motors 58, 62 are driven to control the attitudes of the erecting prisms 16A, 16B, the sending portion 18, and the receiving portion 20. Thus, the attitudes of the erecting prisms 16A, 16B, the sending portion 18, and the receiving portion 20 are controlled so as to be secured to the Earth (inertial system).

Figure 5:
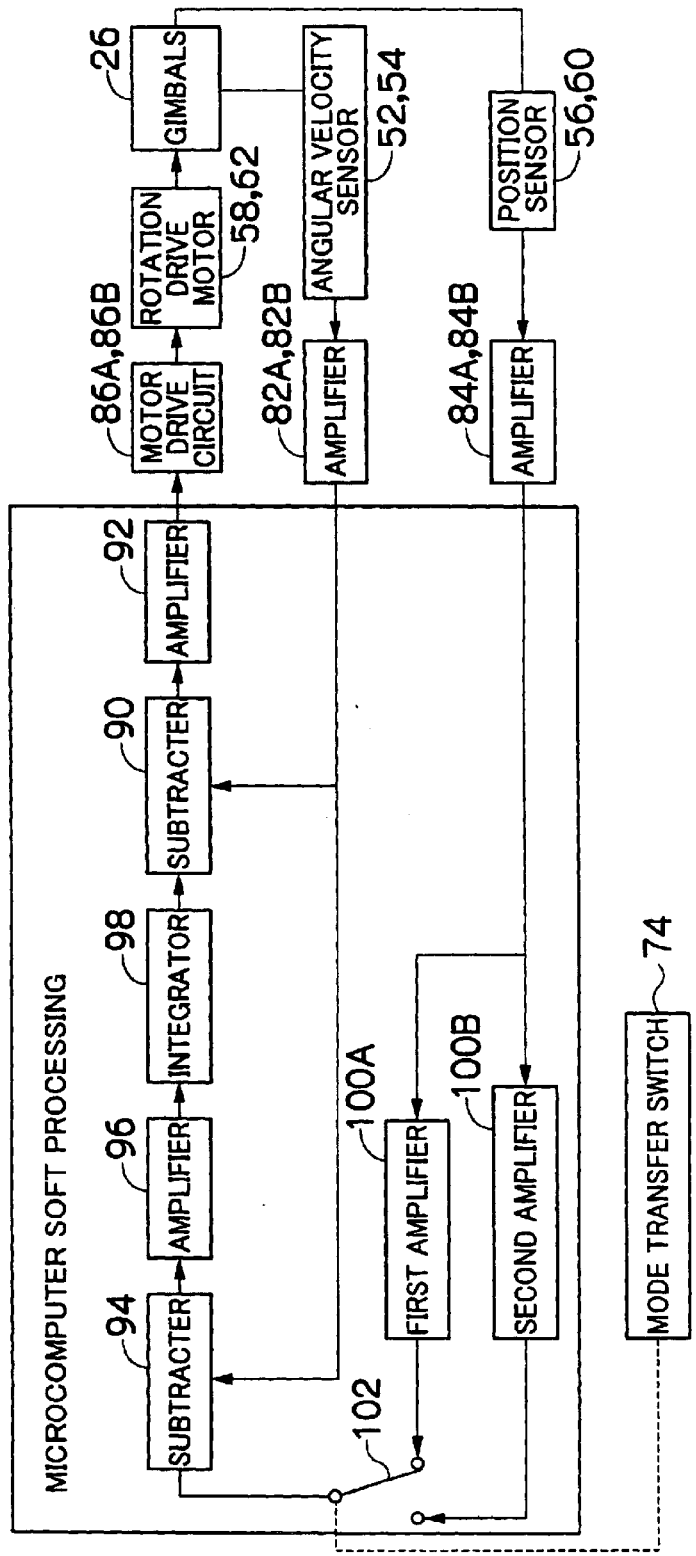
FIG. 5 is a block diagram of a control system of a vibration isolation system.

This control system will be described with reference to the block diagram in FIG. 5. As shown in FIG. 5, the control system includes double feedback loops constituted by a velocity (angular velocity) feedback loop, and a position (angle) feed back loop. The control system also includes a combination of a soft loop by a microcomputer program of the CPU 64 and a hard loop by the angular velocity sensor and the position sensor placed on the gimbals.

In the velocity feedback group, the angular velocity $\omega_V$ around the vertical rotation axis 42 of the gimbals 26 and the angular velocity $\omega_H$ around the horizontal rotation axis 46 are detected by the angular velocity sensors 52, 54, and after the detected values are amplified by the amplifiers 82A, 82B, the detected values are subjected to negative feedback to the motor drive circuits 86A, 86B via a subtracter 90 and an amplifier 92 (a first velocity feedback loop).

Thus, torques opposite in direction are produced in the rotation drive motors 58, 62 to control so that the gimbals 26 is returned to its original attitude against vibration such as the shake of hand, that is, the erecting prisms 16A, 16B are secured to the Earth (inertial system) against vibration with high angular velocity.

In the velocity feedback loop, the detected values $\omega_V$, $\omega_H$ detected by the angular velocity sensors 52, 54 are input to an integrator 98 via a subtracter 94 and an amplifier 96, then the detected values directly input from the amplifiers 82A, 82B are subtracted from values output from the integrator 98 in the subtracter 90, and a subtraction result is subjected to negative feedback to the motor drive circuits 86A, 86B (a second velocity feedback loop). In this way, the detected values by the angular velocity sensors 52, 54 are subjected to the negative feedback via the integrator 98, and thus the control system can be operated even when an offset is zero with respect to a velocity instruction, that is, when a velocity input value and a velocity output value of the feedback loop are equal, and a loop gain can be doubled, thereby allowing high speed stabilization of the gimbals 26 (increasing stabilization accuracy).

The integrator 98 has a function of averaging the input values, and the detected angular velocity value is subtracted from the output value in the subtracter 90. Thus, in other word, the integrator 98 has a damping function of preventing vibration of the first velocity feedback loop.

On the other hand, in the position feedback loop, the angle position $\theta_V$ around the vertical rotation axis 42 of the gimbals 26 and the angle position $\theta_H$ around the horizontal rotation axis 46 are detected by the position sensors 56, 60, and the detected values $\theta_V$, $\theta_H$ are amplified by the amplifiers 84A, 84B and then returned to the motor drive circuits 86A, 86B, thus the rotation drive motors 58, 62 are controlled to bring the gimbals 26 to an angle position $\theta_o$ at a midpoint of an optical axis.

In the position feedback loop, when a large rotation of the gimbals 26 is detected, the rotation drive motors 58, 62 are driven to return a signal responding to the detected value to the motor drive circuits 86A, 86B, and force the gimbals 26 back to the midpoint of the optical axis. This prevents accidental collision of the gimbals 26 with a movement limit end of the body frame 24, and provides a good following property in panning or tilting.

The position feedback loop is configured so that the detected signals from the position sensors 56, 60 are basically subjected to feedback via a first amplifier 100A. An amplification factor of the first amplifier 100A has a linear property of gradually increasing as the rotation angle of the gimbals 26 increases, but an inclination angle is set to a relatively small value. Specifically, the first amplifier 100A is set so as to minimize a gain of the position feedback loop (position gain), thus entering a mode where importance is placed on a vibration isolation function (vibration isolation mode).

On the other hand, following and observing a flying object such as a bird or an airplane requires a quick panning/tilting operation, in particular, a quick panning operation, and it is necessary in such a panning operation that an optical system in the device smoothly follows movement of an observed object. This requires a function counter to the vibration isolation function of securing the optical system to the original position against vibration, and such a panning/tilting operation requires that the vibration isolation function is disabled.

Thus, in the position feedback loop, a second amplifier 100B having a large amplification factor is provided in parallel with the first amplifier 100A having a small amplification factor, and connection can be switched by a transfer switch 102.

The amplification factor of the second amplifier 100B has a linear property of gradually increasing as the rotation angle of the gimbals 26 increases, but an inclination angle is set to a relatively larger value than that of the first amplifier 100A, thus entering a mode where importance is placed on a following function (panning mode).

The transfer switch 102 is switched according to the input from the mode transfer switch 74, and when the vibration isolation mode is selected, the transfer switch 102 is connected to the first amplifier 10A, and when the panning mode is selected, the transfer switch 102 is connected to the second amplifier 100B.

Operations of the laser range finder 10 according to the embodiment configured as described above will be described below.

The laser range finder 10 according to the embodiment has the same function as a general binocular in a state where the powers of the distance measuring system and the vibration isolation system are turned off. Specifically, when the objective lens systems 12A, 12B are aimed at the target, an image created by the objective lens systems 12A, 12B is enlarged and confirmed by the eyepiece systems 14A, 14B. At this time, the image created by the objective lens systems 12A, 12B is inverted, thus the image is erected by the erecting prisms 16A, 16B, and then confirmed by the eyepiece systems 14A, 14B.

On the other hand, when the power of the distance measuring system is turned on by the distance measurement power switch 68 to aim at the target and press the distance measurement switch 70, the distance is measured. Specifically, the time between when the laser light is emitted from the laser light emitting element 28 and when the laser light is reflected by the target and enters the light receiving element 34 is measured, the distance to the target is calculated from the time, and the result is displayed on the LCD panel 80.

When the image confirmed by the eyepiece systems 14A, 14B is blurred by the shake of hand, the power of the vibration isolation system is turned on by the vibration isolation power switch 72 to operate the vibration isolation system. Specifically, the rotation drive motors 58, 62 are driven and controlled, based on the angular velocities around the vertical axis and the horizontal axis detected by the angular velocity sensors 52, 54, and the rotation angles around the vertical axis and the horizontal axis detected by the position sensors 56, 60, and the attitudes are controlled so that the erecting prisms 16A, 16B, the sending portion 18, and the receiving portion 20 supported on the gimbals 26 keep their initial attitudes, that is, the erecting prisms 16A, 16B, the sending portion 18, and the receiving portion 20 are secured to the Earth (inertial system).

This prevents image blurring of the target confirmed by the eyepiece systems 14A, 14B, and allows the laser light to be accurately applied to the aimed target, thus allowing distance measurement with high accuracy. In particular, when a faraway target is measured, a slight shake causes significant displacement of an application point of the laser light, thus such a vibration isolation system is effective.

When the power of the distance measuring system is turned off, and the power of the vibration isolation system only is turned on, the laser range finder 10 according to the embodiment acts as a binocular with a vibration isolation function.

Figure 6:
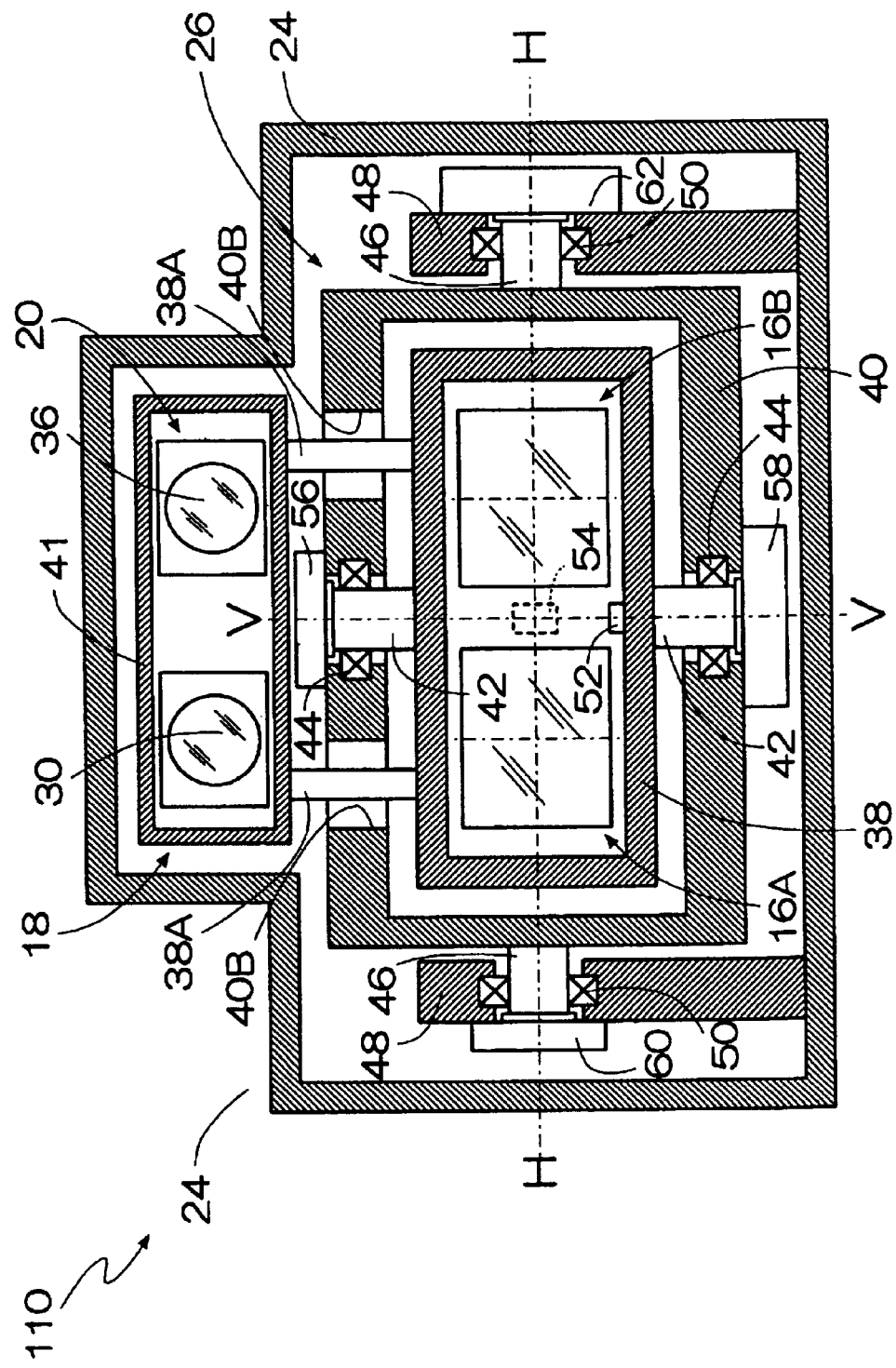
FIG. 6 is a front sectional view of a laser range finder according to another embodiment of the present invention.

In the embodiment, the sending portion 18 and the receiving portion 20 of the laser light are placed inside the internal gimbal 38 of the gimbals 26, but may be placed outside the gimbals 26 as shown in FIG. 6. Specifically, a pair of posts 38A, 38A are vertically provided to stand on a top surface of the internal gimbal 38 that constitutes the gimbals 26, and the pair of posts 38A, 38A are extended upward of the gimbals 26 through a pair of openings 40B, 40B formed in a top surface of the external gimbal 40. Then, a distance measuring unit support frame 41 is mounted to tops of the pair of posts 38A, 38A, and the sending portion 18 and the receiving portion 20 are mounted to the distance measuring unit support frame 41. Thus, operating the vibration isolation system causes the attitudes of the erecting prisms 16A, 16B, the sending portion 18, and the receiving portion 20 to be controlled so as to keep their initial conditions, that is, so as to be secured to the Earth (inertial system), thereby canceling the shake.

Figure 7:
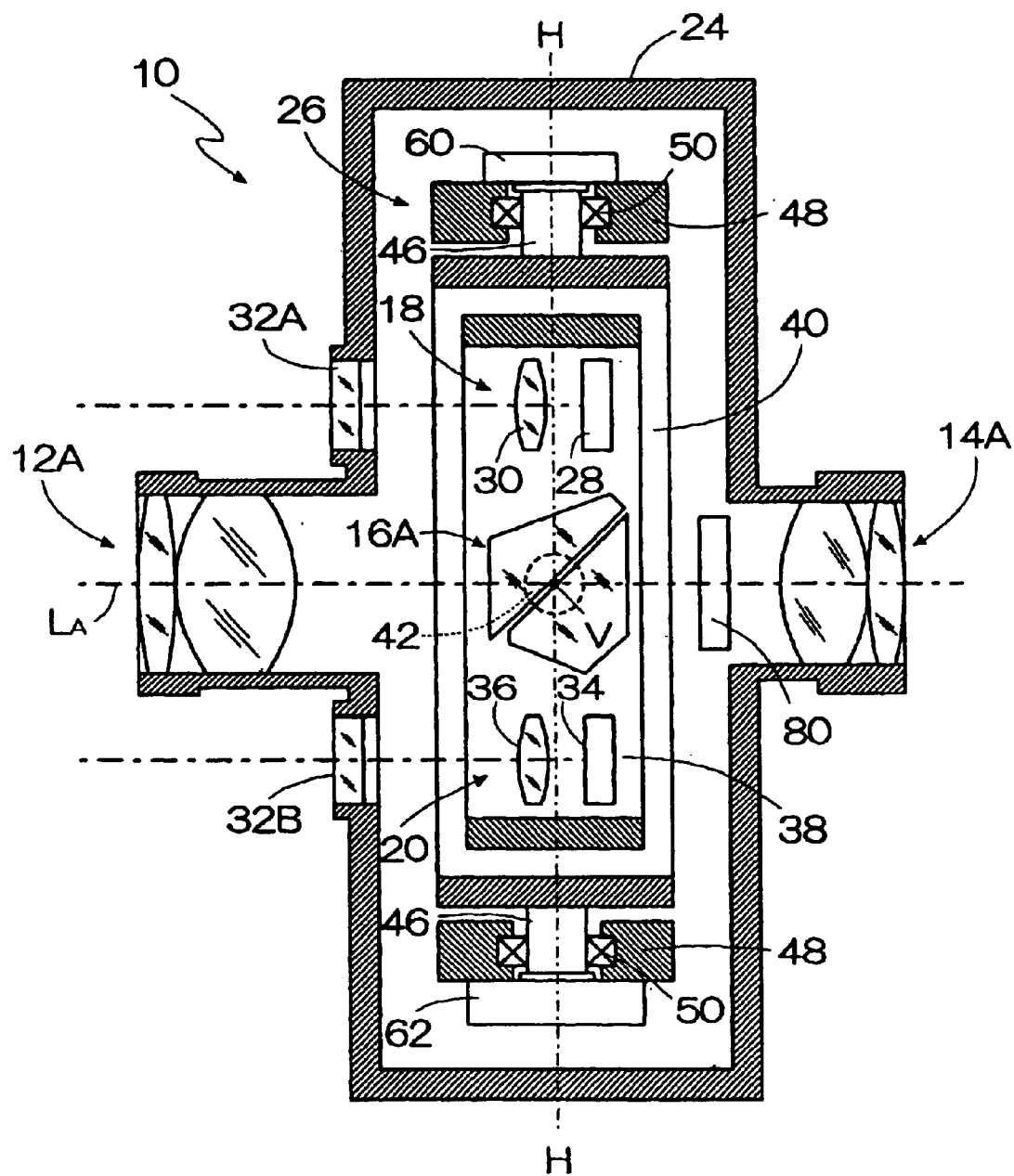
FIG. 7 is a front sectional view of a laser range finder according to a further embodiment of the present invention.

In the embodiment, the laser range finder is constituted by the binocular optical system, but may be constituted by a monocular optical system as shown in FIG. 7.

Figure 8:
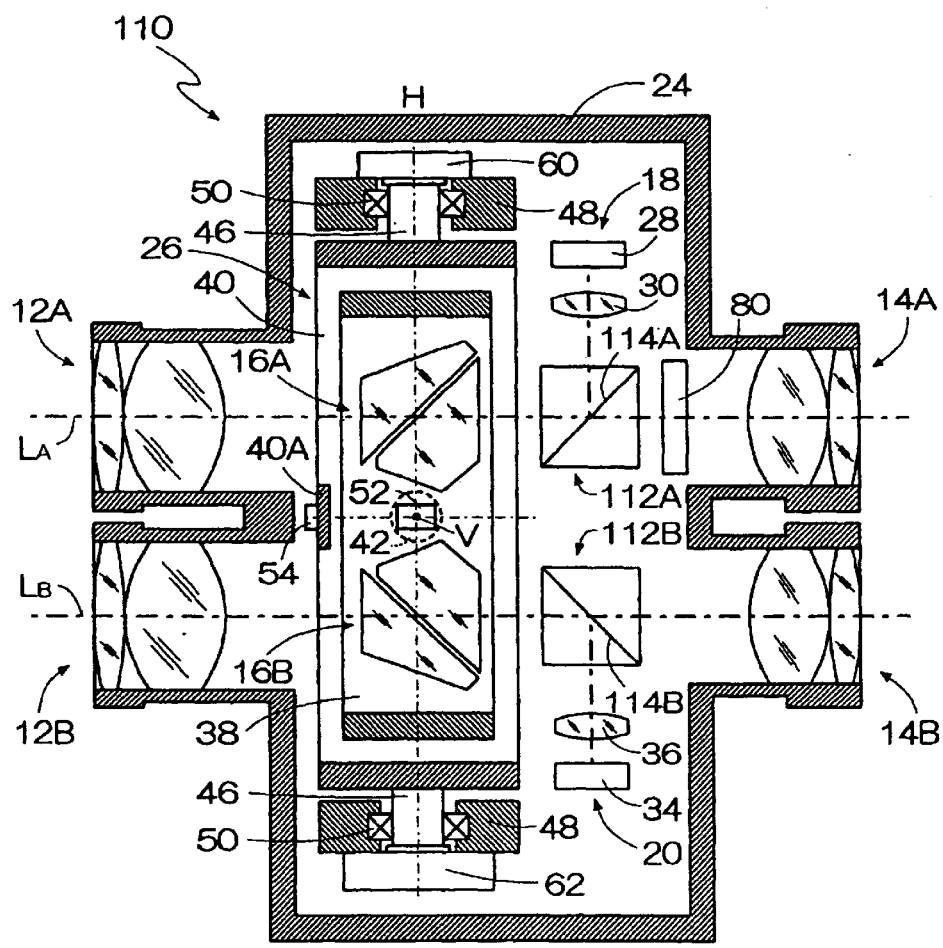
FIG. 8 is a plan sectional view of a laser range finder according to a second embodiment of the present invention.
Figure 9:
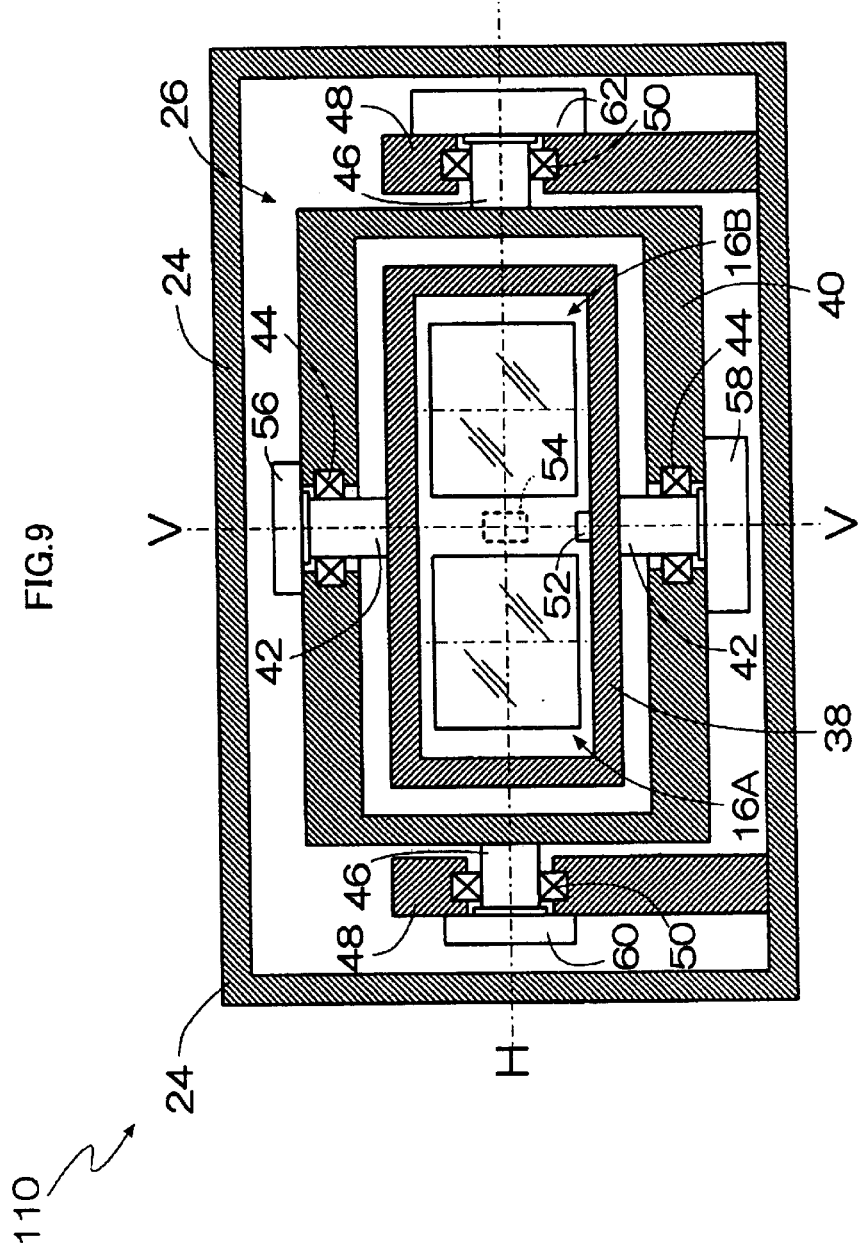
FIG. 9 is a front sectional view of the laser range finder according to the second embodiment of the present invention.

FIGS. 8 and 9 are a plan sectional view and a front sectional view of a laser range finder according to a second embodiment of the present invention.

A laser range finder 110 according to the second embodiment is different from the laser range finder 10 according to the first embodiment in that a sending portion 18 and a receiving portion 20 of laser light are secured to a body frame 24, and the laser light is emitted and received through erecting prisms 16A, 16B supported on a gimbals 26. Like components as in the laser range finder 10 according to the first embodiment are designated by like reference numerals, and descriptions thereof will be omitted.

As shown in FIG. 8, a pair of light dividing prisms 112A, 112B are provided between the pair of erecting prisms 16A, 16B and a pair of eyepiece systems 14A, 14B. The pair of light dividing prisms 112A, 112B are provided on optical axes $L_A$, $L_B$ of a binocular optical system, and have semitransparent mirror surfaces 114A, 114B formed at an angle of 45° with respect to the optical axes $L_A$, $L_B$. The semitransparent mirror surfaces 114A, 114B, which are provided with films that reflect light having a wavelength of 850 to 950 nm, for example, by evaporation or the like, transmit natural light and reflect laser light.

The sending portion 18 is placed so that laser light is emitted from a laser light emitting element 28 perpendicularly to the optical axis $L_A$, and emits the laser light to one light dividing prism 112A. The laser light emitted from the laser light emitting element 28 of the sending portion 18 enters the light dividing prism 112A, then is reflected by the semitransparent mirror surface 114A, and emitted to a target from one objective lens system 12A through one erecting prism 16A.

The laser light reflected by the target enters from the other objective lens system 12B, and enters the other light dividing prism 112B through the other erecting prism 16B. Then, the laser light is reflected by the semitransparent mirror surface 114B of the light dividing prism 112B, separated from the natural light, and emitted perpendicularly to the optical axis $L_S$.

The receiving portion 20 is placed in a position where the reflected light of the laser reflected by the semitransparent mirror surface 114B of the light dividing prism 112B enters, and a light receiving element 34 receives the laser light emitted from the light dividing prism 112B via a receiving lens 36.

Like the laser range finder 10 according to the first embodiment, the laser range finder 110 according to the second embodiment configured as described above has the same function as a general binocular in a state where powers of a distance measuring system and a vibration isolation system are turned off. Specifically, when the objective lens systems 12A, 12B are aimed at the target, an image created by the objective lens systems 12A, 12B is enlarged and confirmed by the eyepiece systems 14A, 14B.

On the other hand, when the power of the distance measuring system is turned on by the distance measurement power switch 68 to aim at the target and press the distance measurement switch 70, the laser light is emitted from the laser light emitting element 28 of the sending portion 18 and enters the light dividing prism 112A via a sending lens 30. Then, the laser light is reflected by the semitransparent mirror surface 114A of the light dividing prism 112A, and emitted to the target from one objective lens system 12A through one erecting prism 16A.

The laser light reflected by the target enters from the other objective lens system 12B, and enters the other light dividing prism 112B through the other erecting prism 16B. Then, the laser light is reflected by the semitransparent mirror surface 114B of the light dividing prism 112B, separated from the natural light, and enters the light receiving element 34 via the receiving lens 36 of the receiving portion 20.

Then, a time between when the laser light is emitted from the laser light emitting element 28 and when the laser light is reflected by the target and enters the light receiving element 34 is measured, a distance to the target is calculated from the time, and the result is displayed on the LCD panel 80.

When the power of the vibration isolation system is turned on by the vibration isolation power switch 72, rotation drive motors 58, 62 are driven and controlled, based on angular velocities around a vertical axis and a horizontal axis detected by angular velocity sensors 52, 54, and rotation angles around the vertical axis and the horizontal axis detected by position sensors 56, 60, and attitudes are controlled so that the erecting prisms 16A, 16B supported on the gimbals 26 keep their initial attitudes, that is, the erecting prisms 16A, 16B are secured to the Earth (inertial system).

This prevents image blurring of the target confirmed by the eyepiece systems 14A, 14B, and allows the laser light to be accurately applied to the aimed target, thus allowing distance measurement with high accuracy.

In the laser range finder 110 according to the embodiment, the light emitting optical system (sending portion 18) and the light receiving optical system (receiving portion 20) of the laser light are also used as the binocular optical system, thus providing a compact configuration of the whole finder. At this time, the laser light is separated from the natural light by the light dividing prisms 112A, 112B, thus even if the light emitting optical system and the light receiving optical system are also used as the binocular optical system, no laser light enters the eyepiece systems 14A, 14B of the binocular optical system, and no laser light enters eyes of an observer.

Figure 10:
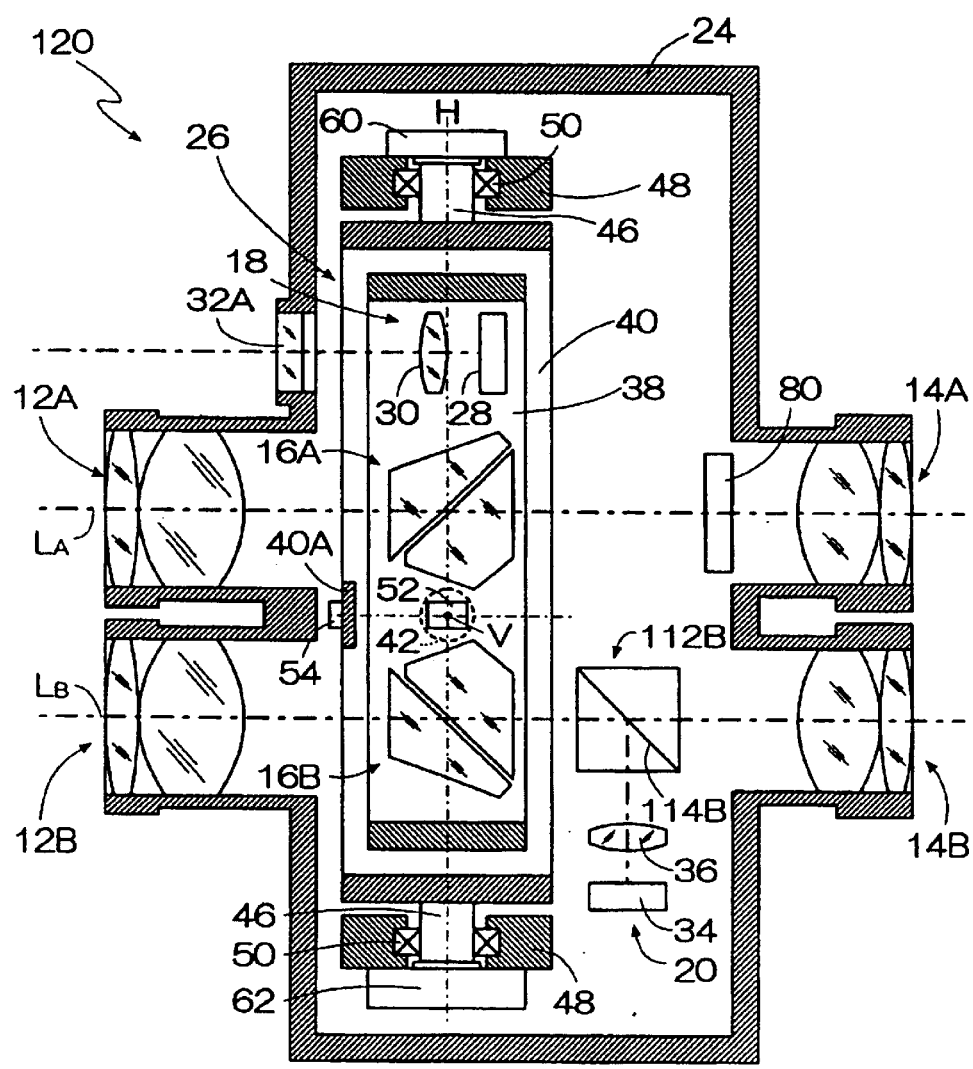
FIG. 10 is a plan sectional view of a laser range finder according to a third embodiment of the present invention.
Figure 11:
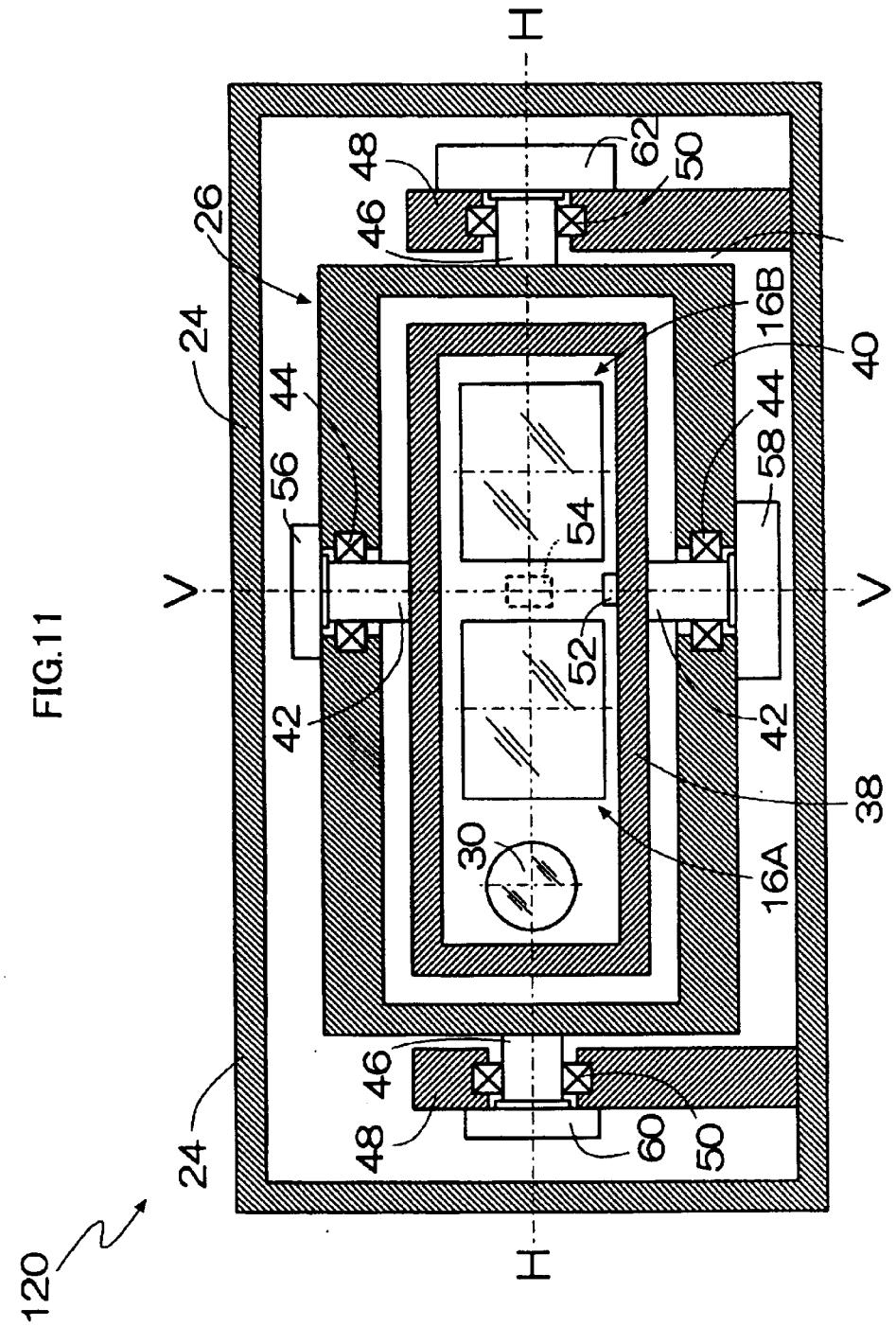
FIG. 11 is a front sectional view of the laser range finder according to the third embodiment of the present invention.

FIGS. 10 and 11 are a plan sectional view and a front sectional view of a laser range finder according to a third embodiment of the present invention.

A laser range finder 120 according to the third embodiment is different from the laser range finders 10, 110 according to the first and the second embodiments in that a sending portion 18 of laser light is supported on a gimbals 26, and a receiving portion 20 is secured to a body frame 24. Like components as in the laser range finders 10, 110 according to the first and the second embodiments are designated by like reference numerals, and descriptions thereof will be omitted.

As shown in FIGS. 10 and 11, the sending portion 18 is supported on the body frame 24 via the gimbals 26, and its attitude is controlled together with erecting prisms 16A, 16B. The laser light emitted from a laser light emitting element 28 of the sending portion 18 is emitted to a target from a laser light emitting window 32A via a sending lens 30.

On the other hand, as shown in FIG. 10, a light diving prism 112B is placed between one erecting prism 16B and an eyepiece system 14B, and the laser light reflected by the target enters from an objective lens system 12B, and enters the light dividing prism 112B through the erecting prism 16B. Then, the laser light is reflected by a semitransparent mirror surface 114B of the light dividing prism 112B, separated from natural light, and emitted perpendicularly to an optical axis $L_B$.

The receiving portion 20 is placed in a position where the reflected light of the laser reflected by the semitransparent mirror surface 114B of the light dividing prism 112B, and a light receiving element 34 receives the laser light emitted from the light dividing prism 112B through a receiving lens 36.

Like the laser range finders 10, 110 according to the first and the second embodiments, the laser range finder 120 according to the embodiment configured as described above has the same function as a general binocular in a state where powers of a distance measuring system and a vibration isolation system are turned off.

On the other hand, when the power of the distance measuring system is turned on by the distance measurement power switch 68 to aim at the target and press the distance measurement switch 70, the laser light is emitted from the laser light emitting element 28 of the sending portion 18 and emitted to the target from the laser light emitting window 32A via the sending lens 30.

The laser light reflected by the target enters from one objective lens system 12B, and enters the light dividing prism 112B through one erecting prism 16B. Then, the laser light is reflected by the semitransparent mirror surface 114B of the light dividing prism 112B, separated from the natural light, and enters the light receiving element 34 via the receiving lens 36 of the receiving portion 20. A time between when the laser light is emitted from the laser light emitting element 28 and when the laser light is reflected by the target and enters the light receiving element 34 is measured, a distance to the target is calculated from the time, and the result is displayed on the LCD panel 80.

When the power of the vibration isolation system is turned on by the vibration isolation power switch 72, rotation drive motors 58, 62 are driven and controlled, based on angular velocities around a vertical axis and a horizontal axis detected by angular velocity sensors 52, 54, and rotation angles around the vertical axis and the horizontal axis detected by position sensors 56, 60, and the attitudes are controlled so that the erecting prisms 16A, 16B and the sending portion 18 supported on the gimbals 26 keep their initial attitudes, that is, the erecting prisms 16A, 16B and the sending portion 18 are secured to the Earth (inertial system).

This prevents image blurring of the target confirmed by the eyepiece systems 14A, 14B, and allows the laser light to be accurately applied to the aimed target, thus allowing distance measurement with high accuracy.

In the laser range finder 120 according to the embodiment, the light receiving optical system of the laser light is also used as the binocular optical system, thus providing a compact configuration of the whole finder, like the second embodiment. At this time, the laser light is separated from the natural light by the light dividing prism 112B, thus even if the light receiving optical system is also used as the binocular optical system, no laser light enters the eyepiece system 14B of the binocular optical system, and no laser light enters eyes of an observer.

In the embodiment, the sending portion 18 of the laser light is supported on the gimbals 26, and the receiving portion 20 is secured to the body frame 24, but the receiving portion 20 may be supported on the gimbals 26, and the sending portion 18 may be secured to the body frame 24.

Figure 13:
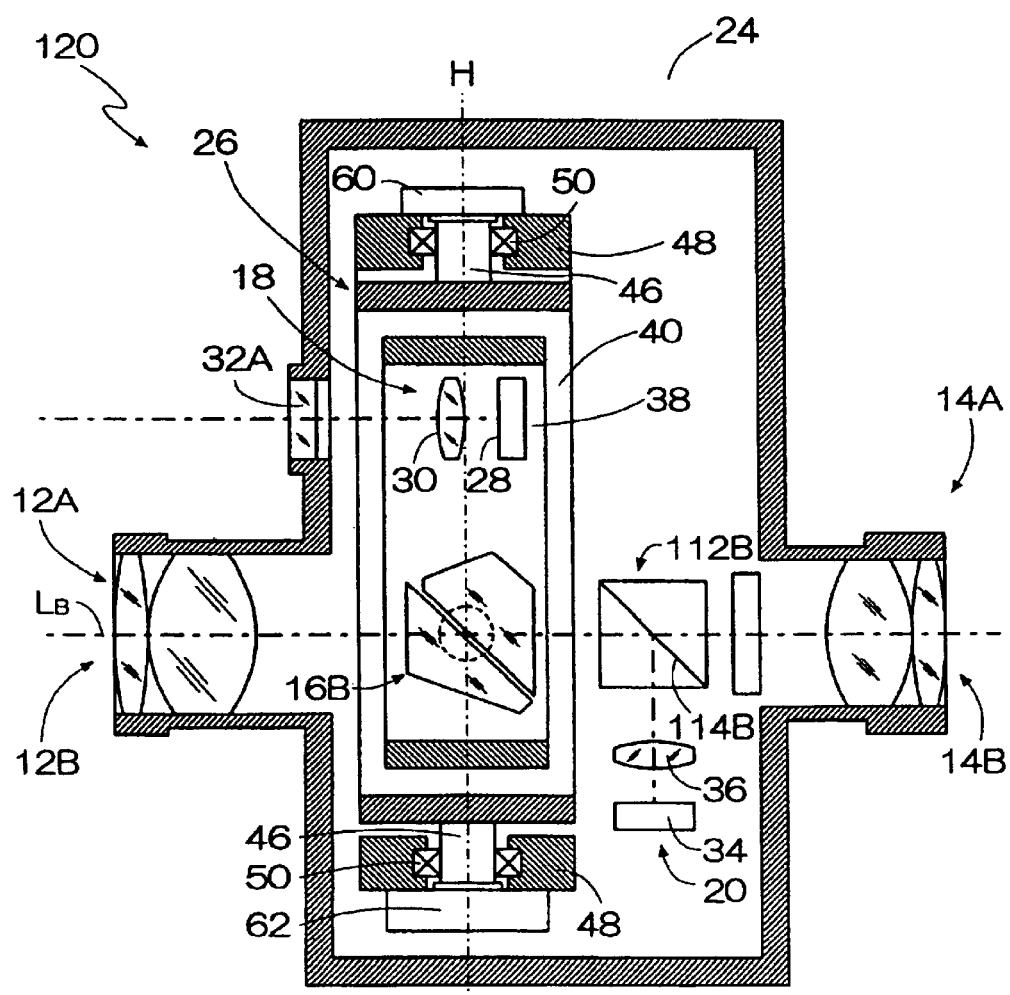
FIG. 13 is a plan sectional view of a laser range finder according to a further embodiment of the present invention.

In the embodiment, the laser range finder is constituted by the binocular optical system, but may be constituted by a monocular optical system as shown in FIG. 13.

Figure 12:
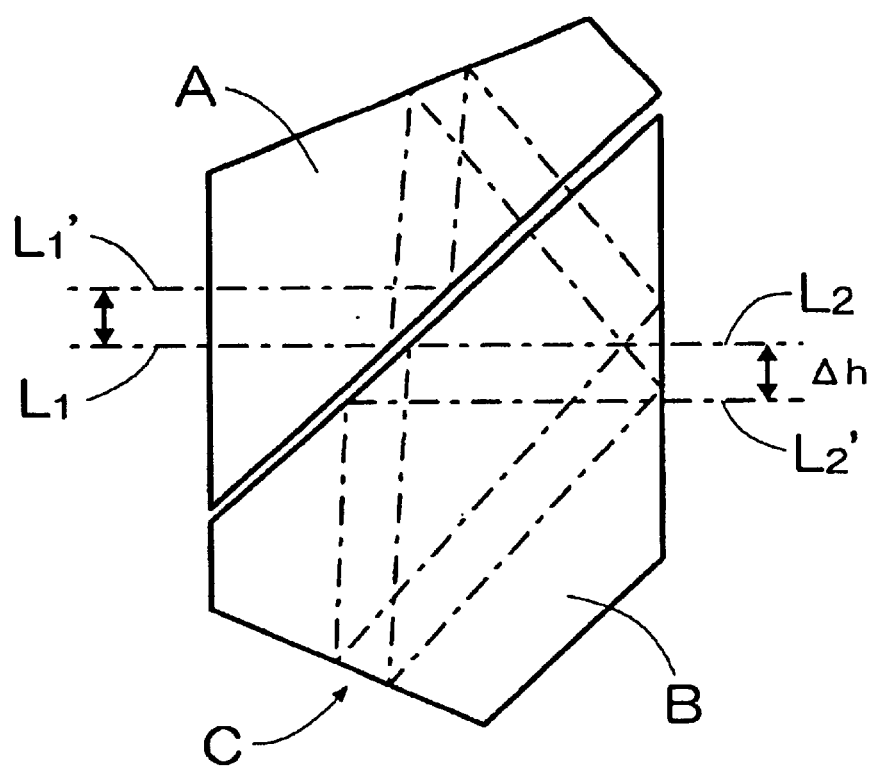
FIG. 12 is a side view for illustrating an erecting prism.

The erecting prisms 16A, 16B used in the laser range finder according to the embodiment include a Schmitt erecting prism, an Abbe erecting prism, a Bauern Fend erecting prism, a Porro erecting prism, a Dach (Roof) erecting prism, or the like, and FIG. 12 shows a Schmidt erecting prism.

The Schmitt erecting prism includes a prism A and a prism B as shown in FIG. 12, and part C of the prism A is a Dach (Roof) reflection surface. In such an erecting prism, there is a position of an entering optical axis in which an entering optical axis $L_1$ and an emitting optical axis $L_2$ are aligned as shown. In the erecting prism in which the entering optical axis $L_1$ and the emitting optical axis $L_2$ are aligned, as shown in FIG. 12, a light beam $L_1'$ distant upward by $\Delta h$ from the entering optical axis $L_1$ and parallel to the entering optical axis $L_1$ passes the erecting prism and then becomes a light beam $L_2'$ distant downward by $\Delta h$ from the emitting optical axis $L_2$ and parallel to the optical axis $L_2$.

The angular velocity sensors 52, 54 are piezoelectric vibration gyro sensors that include a columnar, for example, a cylindrical vibrator and a plurality of piezoelectric ceramics and uses Coriolis force, in which at least two detection piezoelectric ceramics and at least one feedback piezoelectric ceramic are provided on a side of the columnar vibrator. Detected signals having different values depending on vibration are output from each detection piezoelectric ceramic, and differences are calculated to obtain angular velocities. The feedback piezoelectric ceramic is used for correcting phases of the detected signals. The angular velocity sensors have simple and extremely compact structures, thus providing a simple and compact structure of the device. Further, a signal-to-noise ratio and accuracy are high, thus allowing angular velocity control with high accuracy.

The laser range finder according to the present invention is not limited to the above described embodiments, and various changes of aspects can be made.

For example, as a device that detects the angular velocity, besides the cylindrical vibrator type piezoelectric vibration gyro sensor, a piezoelectric vibration gyro sensor using various types of vibrators such as a triangular prism vibrator type, a square prism vibrator type, or a tuning fork vibrator type, and further, other angular velocity sensors can be used.

As a device that detects the angle position, various angle sensors such as of a resolver type, a synchro type, or a rotary encoder type can be used instead of the position sensor according to the embodiment.

In the series of embodiments described above, the vibration isolation mechanism is configured so that the erecting prisms 16A, 16B are supported on the gimbals 26, and the attitudes are controlled so as to be secured to the inertial system, thus preventing the image blurring, but the vibration isolation mechanism is not limited to this. For example, the vibration isolation mechanism may be configured so that the optical element that constitutes the binocular optical system is supported on the gimbals, and the attitude is controlled so as to be secured to the inertial system.

According to the present invention, the sending portion and the receiving portion of the laser light are provided on the vibration isolation device, and their attitudes are controlled so as to be secured to the inertial system together with the optical element that constitutes the monocular optical system or the binocular optical system. This allows accurate aiming at a faraway target and measurement of a distance thereto with high accuracy.

According to the present invention, the laser light is emitted from the sending portion and received by the receiving portion through the optical element whose attitude is controlled so as to be secured to the inertial system. This allows accurate aiming at a faraway target and measurement of a distance thereto with high accuracy.

According to the present invention, the sending portion and the receiving portion of the laser light are supported on the gimbals together with the erecting prism, and their attitudes are controlled so as to be secured to the inertial system together with the erecting prism by the vibration isolation device. This allows accurate aiming at a faraway target and measurement of a distance thereto with high accuracy.

According to the present invention, the laser light is emitted from the sending portion and received by the receiving portion via the erecting prism whose attitude is controlled so as to be secured to the inertial system. This allows accurate aiming at a faraway target and measurement of a distance thereto with high accuracy.

According to the present invention, the laser light is emitted to the target from the sending portion whose attitude is controlled so as to be secured to the inertial system together with the erecting prism, and the laser light reflected by the target is received by the receiving portion via the erecting prism whose attitude is controlled so as to be secured to the inertial system. This allows accurate aiming at a faraway target and measurement of a distance thereto with high accuracy.

According to the present invention, the laser light emitted from the sending portion is emitted to the target via the erecting prism whose attitude is controlled so as to be secured to the inertial system, and the laser light reflected by the target is received by the receiving portion whose attitude is controlled so as to be secured to the inertial system together with the erecting prism. This allows accurate aiming at a faraway target and measurement of a distance thereto with high accuracy.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A laser range finder, comprising:
an optical system which is one of monocular and binocular and has an erecting prism between an objective lens and an eyepiece;
a vibration isolation device which controls an attitude of an optical element constituting the optical system so as to be secured to an inertial system;
a sending portion which is provided on the vibration isolation device and emits laser light;
a receiving portion which is provided on the vibration isolation device and receives the laser light reflected by a target;
a measurement device which measures a time between when the laser light is emitted from the sending portion and when the laser light is received by the receiving portion; and
a calculation device which calculates a distance to the target based on the time measured by the measurement device.

2. A laser range finder, comprising:
a binocular optical system which has a pair of erecting prisms between a pair of objective lenses and a pair of eyepieces;
a vibration isolation device which controls attitudes of a pair of optical elements constituting the binocular optical system so as to be secured to an inertial system;

a sending portion which emits laser light through one optical element;

a receiving portion which receives the laser light reflected by a target through the optical element;

a measurement device which measures a time between when the laser light is emitted from the sending portion and when the laser light is received by the receiving portion; and a calculation device which calculates a distance to the target based on the time measured by the measurement device.

3. A laser range finder, comprising:

an optical system which is one of monocular and binocular and has an erecting prism between an objective lens and an eyepiece;

a body frame to which the objective lens and the eyepiece are secured;

a vibration isolation device which rotatably supports the erecting prism on the body frame via a gimbals and controls an attitude of the erecting prism so as to secure the erecting prism to an inertial system;

a sending portion which is supported on the gimbals together with the erecting prism and emits laser light;

a receiving portion which is supported on the gimbals together with the erecting prism and receives the laser light reflected by a target;

a measurement device which measures a time between when the laser light is emitted from the sending portion and when the laser light is received by the receiving portion; and a calculation device which calculates a distance to the target based on the time measured by the measurement device.

4. A laser range finder, comprising:

a binocular optical system having a pair of erecting prisms between a pair of objective lenses and a pair of eyepieces;

a body frame to which the pair of objective lenses and the pair of eyepieces are secured;

a vibration isolation device which supports the pair of erecting prisms on the body frame via a gimbals and controls attitudes of the pair of erecting prisms so as to secure the pair of erecting prisms to an inertial system;

a sending portion which is provided on the body frame and emits laser light;

a first optical path dividing device which is provided on the body frame and between one erecting prism and one eyepiece, transmits visible light, and reflects the laser light emitted from the sending portion to guide the laser light to the one erecting prism;

a second optical path dividing device which is provided on the body frame and between the other erecting prism and the other eyepiece, and separates the laser light reflected by a target from the visible light;

a receiving portion which is provided on the body frame and receives the laser light separated by the second optical path dividing device;

a measurement device which measures a time between when the laser light is emitted from the sending portion and when the laser light is received by the receiving portion; and a calculation device which calculates a distance to the target based on the time measured by the measurement device.

5. A laser range finder, comprising:

an optical system which is one of monocular and binocular and has an erecting prism between an objective lens and an eyepiece;

a body frame to which the objective lens and the eyepiece are secured;

a vibration isolation device which rotatably supports the erecting prism on the body frame via a gimbals and controls an attitude of the erecting prism so as to secure the erecting prism to an inertial system;

a sending portion which is supported on the gimbals together with the erecting prism and emits laser light;

an optical path dividing device which is provided on the body frame and between the erecting prism and the eyepiece, and separates the laser light reflected by a target from visible light;

a receiving portion which is provided on the body frame and receives the laser light separated by the optical path dividing device;

a measurement device which measures a time between when the laser light is emitted from the sending portion and when the laser light is received by the receiving portion; and a calculation device which calculates a distance to the target based on the time measured by the measurement device.

6. A laser range finder, comprising:

an optical system which is one of monocular and binocular and has an erecting prism between an objective lens and an eyepiece;

a body frame to which the objective lens and the eyepiece are secured;

a vibration isolation device which supports the erecting prism on the body frame via a gimbals and controls an attitude of the erecting prism so as to secure the erecting prism to an inertial system;

a sending portion which is provided on the body frame and emits laser light;

an optical path dividing device which is provided between the erecting prism and the eyepiece, transmits visible light, and reflects the laser light emitted from the sending portion to guide the laser light to the erecting prism;

a receiving portion which is supported on the gimbals together with the erecting prism and receives the laser light reflected by the target;

a measurement device which measures a time between when the laser light is emitted from the sending portion and when the laser light is received by the receiving portion; and a calculation device which calculates a distance to the target based on the time measured by the measurement device.

* * * * *